US009220072B2

(12) United States Patent
Hsu et al.

(10) Patent No.: US 9,220,072 B2
(45) Date of Patent: *Dec. 22, 2015

(54) POWER CONTROL METHOD TO MITIGATE INTERFERENCE FOR IN-DEVICE COEXISTENCE

(71) Applicant: MEDIATEK INC., Hsinchu (TW)

(72) Inventors: Chia-Chun Hsu, Taipei (TW); Michael Roberts, Neuilly sur Seine (FR); Chih-Yuan Lin, Yilan (TW); Yih-Shen Chen, Hsin-Chu (TW); I-Kang Fu, Taipei (TW)

(73) Assignee: MEDIATEK INC. (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/584,493

(22) Filed: Dec. 29, 2014

(65) Prior Publication Data

US 2015/0119098 A1    Apr. 30, 2015

Related U.S. Application Data

(63) Continuation of application No. 13/344,589, filed on Jan. 5, 2012, now Pat. No. 8,934,362.

(60) Provisional application No. 61/430,283, filed on Jan. 6, 2011.

(51) Int. Cl.
*G01R 31/08* (2006.01)
*H04W 52/24* (2009.01)
(Continued)

(52) U.S. Cl.
CPC ............ *H04W 52/243* (2013.01); *H04W 52/34* (2013.01); *H04W 52/367* (2013.01); *H04W 72/048* (2013.01)

(58) Field of Classification Search
USPC ........................................................ 370/252
See application file for complete search history.

(56) References Cited

U.S. PATENT DOCUMENTS 8,289,922 B2    10/2012  Ewe et al. ...................... 370/331
8,934,362 B2 *  1/2015   Hsu et al. ...................... 370/252
(Continued)

FOREIGN PATENT DOCUMENTS

JP    2013530326 A    6/2010
JP    2013545327 A    9/2010

OTHER PUBLICATIONS

USPTO, Office Action for the U.S. Appl. No. 13/344,589 dated Apr. 30, 2013.
(Continued)

*Primary Examiner* — Mark Rinehart
*Assistant Examiner* — Angel Brockman
(74) *Attorney, Agent, or Firm* — Imperium Patent Works; Zheng Jin; Helen Mao

(57) ABSTRACT

A power control method to mitigate in-device coexistence (IDC) interference is provided. A wireless communication device (UE) is equipped with a first LTE radio module and a second co-located WiFi/BT/GSNN radio module. Upon detecting coexistence or IDC interference, the UE applies power control method to mitigate the interference. In a first embodiment, the LTE radio module adjusts its power parameters locally without informing the serving eNB. In a second embodiment, the LTE radio module adjusts its power parameters and implicit informs the eNB through existing PHR reporting. In a third embodiment, the LTE radio module changes its power or power class and explicitly informs the eNB through UE capability or new RRC message or MAC CE. Power control can be used as a low cost and lightweight solution before applying other heavyweight solutions that either require more resource or control overhead, or have higher impact on throughput.

20 Claims, 5 Drawing Sheets

(51) Int. Cl.
*H04W 52/34* (2009.01)
*H04W 52/36* (2009.01)
*H04W 72/04* (2009.01)

(56) References Cited

U.S. PATENT DOCUMENTS

| | | | |
|---|---|---|---|
| 2006/0003787 A1 | 1/2006 | Heo et al. | 455/522 |
| 2009/0046596 A1 | 2/2009 | Ewe et al. | 370/252 |
| 2009/0176454 A1 | 7/2009 | Chen et al. | 455/63.1 |
| 2010/0098135 A1 | 4/2010 | Eitan | 375/141 |
| 2010/0120446 A1 | 5/2010 | Gaal | 455/452.2 |
| 2010/0304685 A1 | 12/2010 | Wietfeldt et al. | 455/67.11 |
| 2010/0304770 A1 | 12/2010 | Wietfeldt et al. | 455/509 |
| 2010/0323745 A1 | 12/2010 | Chen et al. | 455/522 |
| 2011/0009136 A1 | 1/2011 | Mantravadi et al. | 455/501 |
| 2011/0081936 A1 | 4/2011 | Haim et al. | 455/522 |
| 2011/0194423 A1 | 8/2011 | Cho et al. | 370/252 |
| 2011/0256834 A1 | 10/2011 | Dayal et al. | 455/67.7 |
| 2011/0318720 A1 | 12/2011 | Giard | 434/258 |
| 2012/0071106 A1 | 3/2012 | Kadous et al. | 455/67.11 |
| 2012/0163307 A1 | 6/2012 | Wang et al. | 370/329 |

OTHER PUBLICATIONS

USPTO, Office Action for the U.S. Appl. No. 13/344,589 dated Feb. 26, 2014.

International Search Report and Written Opinion of International Search Authority for PCT/CN2012/070019 dated Apr. 12, 2012(13 pages).

3GPP TR 36.816 v1.0.0, Study on signaling and procedure for interference avoidance for in-device coexistence, WWW.3GPP.org, Nov. 30, 2010, p. 7 lines 18-19, p. 9 line 3 to p. 10 line 3, p. 18 lines 9-10, p. 21 lines 7-10, p. 26 lines 2-9, tableA_2.4-1, figure A_2.1-3, figure A_2.1-4, figure A_2.4-1.

JPO, Office Action for the JP application 2013-547800 dated Jul. 1, 2014 (4 pages).

* cited by examiner

POWER CONTROL METHOD TO MITIGATE INTERFERENCE FOR IN-DEVICE COEXISTENCE

CROSS REFERENCE TO RELATED APPLICATIONS

This application is a continuation, and claims priority under 35 U.S.C. §120 from nonprovisional U.S. patent application Ser. No. 13/344,589, entitled "Power Control Method to Mitigate Interference for In-Device Coexistence," filed on Jan. 5, 2012, the subject matter of which is incorporated herein by reference. application Ser. No. 13/344,589, in turn, claims priority under 35 U.S.C. §119 from U.S. Provisional Application No. 61/430,283, entitled "Power Control Method to Mitigate Interference for In-Device Coexistence," filed on Jan. 6, 2011, the subject matter of which is incorporated herein by reference.

TECHNICAL FIELD

The disclosed embodiments relate generally to wireless network communications, and, more particularly, to in-device coexistence (IDC) interference mitigation.

BACKGROUND

Ubiquitous network access has been almost realized today. From network infrastructure point of view, different networks belong to different layers (e.g., distribution layer, cellular layer, hot spot layer, personal network layer, and fixed/wired layer) that provide different levels of coverage and connectivity to users. Because the coverage of a specific network may not be available everywhere, and because different networks may be optimized for different services, it is thus desirable that user devices support multiple radio access networks on the same device platform. As the demand for wireless communication continues to increase, wireless communication devices such as cellular telephones, personal digital assistants (PDAs), smart handheld devices, laptop computers, tablet computers, etc., are increasingly being equipped with multiple radio transceivers. A multiple radio terminal (MRT) may simultaneously include a Long-Term Evolution (LTE) or LTE-Advanced (LTE-A) radio, a Wireless Local Area Network (WLAN, e.g., WiFi) access radio, a Bluetooth (BT) radio, and a Global Navigation Satellite System (GNSS) radio. In the MRT, the LTE-A radio is an Orthogonal Frequency Division Multiple Access-based (OFDMA-based) mobile broadband technology that is capable of providing global roaming services, and the WiFi radio is capable of providing huge bandwidth transmission via local access. The combination of LTE-A and WiFi radio is one of the examples of WiFi offloading, which is a common paradigm of future communications. Multiple radios co-located or coexisted in the same communication device are also referred to as in-device coexistence (IDC).

Due to spectrum regulation, different technologies may operate in overlapping or adjacent radio spectrums. For example, LTE/LTE-A TDD mode often operates at 2.3-2.4 GHz, WiFi often operates at 2.400-2.483.5 GHz, and BT often operates at 2.402-2.480 GHz. Simultaneous operation of multiple radios co-located/coexisted on the same physical device, therefore, can suffer significant degradation including significant coexistence interference (e.g., IDC interference) between them because of the overlapping or adjacent radio spectrums. Due to physical proximity and radio power leakage, when the transmission of data for a first radio transceiver overlaps with the reception of data for a second radio transceiver in time domain, the second radio transceiver reception can suffer due to interference from the transmission of the first radio transceiver. Likewise, data transmission of the second radio transceiver can interfere with data reception of the first radio transceiver.

Various IDC interference mitigation solutions have been sought. Among the different interference mitigation solutions, power management is one of the possible solutions. One fundamental problem for IDC interference is that the transmission power of one radio transceiver is too strong to allow simultaneous reception on another co-located/coexisted radio transceiver. Therefore, if the transmitting radio transceiver can reduce its transmission power, then simultaneous reception of other transceivers becomes possible. In general, power control (PC) is a common functionally supported by every radio transceiver so reusing such mechanism to mitigate IDC interference is a low cost and backward compatible option. Power control can be used as a lightweight solution before applying other heavyweight solutions that either require more resource or control overhead (e.g., FDM/RRM), or have higher impact on throughput (e.g., TDM).

In LTE/LTE-A systems, most of the activities of a mobile station (UE) are controlled by the network and the serving base station (eNodeB). For example, the transmit power of each UE needs to be maintained at a certain level and regulated by the network in OFDMA systems. The maximum UE output power and the current UE transmit power, however, is different depending on UE capability and usage. Typically, an eNodeB adjusts the transmit power of each UE based on the following information from each UE: power headroom report (PHR), UE-configured maximum transmitting power (Pcmax), sounding reference signal (SRS), and channel quality indicator (CQI). On the other hand, each UE adjusts its own transmitting power based on the pathloss compensation (open loop PC) and based on physical downlink control channel (PDCCH) grant or transmit power control (TPC) command (close loop PC) from the serving eNodeB. To mitigate IDC interference via power control, it is desirable for the UE to indicate the IDC interference problem such that the serving eNodeB can adjust the transmitting power of the UE accordingly.

SUMMARY

A power control method to mitigate in-device coexistence (IDC) interference is provided. A wireless communication device (UE) is equipped with a first LTE radio module and a second co-located WiFi/BT/GSNN radio module. Upon detecting coexistence or IDC interference, the UE applies power control method to mitigate the interference. In general, power control (PC) is a common functionally supported by every radio transceiver so reusing such mechanism to mitigate IDC interference is a low cost and backward compatible option. Power control can be used as a lightweight solution before applying other heavyweight solutions that either require more resource or have higher impact on throughput.

In a first embodiment, the LTE radio module adjusts its power or power parameters locally without informing the serving eNB. In a second embodiment, the LTE radio module adjusts its power parameters and implicit informs the eNB through existing PHR reporting. For example, the LTE radio module adjusts the UE-configured maximum transmitting power $P_{CMAX}$ to a lower value. $P_{CMAX}$ may be adjusted via maximum power reduction (MPR, A-MPR, P-MPR). In a third embodiment, the LTE radio module changes its power or power class and explicitly informs the eNB through UE capability or new RRC message or MAC CE.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
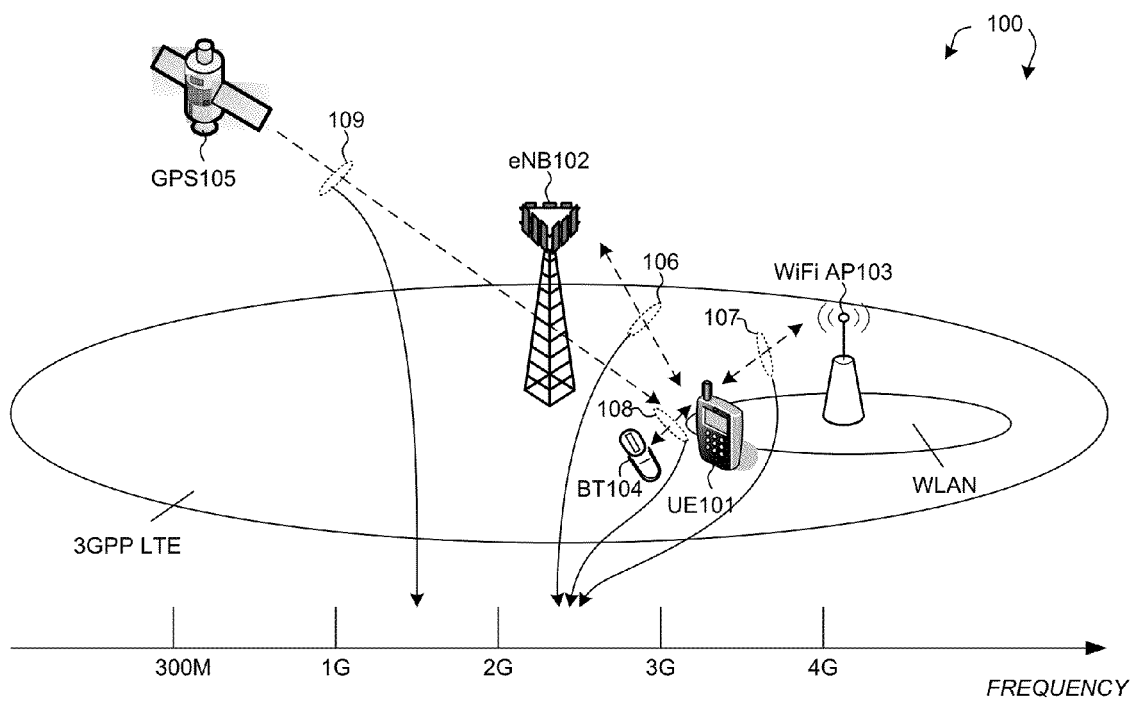
FIG. 1 illustrates a user equipment (UE) having multiple radio modules in a wireless communication system in accordance with one novel aspect.

FIG. 1 illustrates a user equipment UE101 having multiple radio modules in a wireless communication system 100 in accordance with one novel aspect. Wireless communication system 100 comprises a user equipment UE101, a serving base station (e.g., evolved node-B) eNB102, a WiFi access point WiFi AP103, a Bluetooth device BT104, and a global positioning system satellite device GPS105. Wireless communication system 100 provides various network access services for UE101 via different radio access technologies. For example, eNB102 provides OFDMA-based cellular radio network (e.g., a 3GPP Long-Term Evolution (LTE) or LTE-Advanced (LTE-A) system) access, WiFi AP103 provides local coverage in Wireless Local Area Network (WLAN) access, BT104 provides short-range personal network communication, and GPS105 provides global access as part of a Global Navigation Satellite System (GNSS). To better facilitate the various radio access technologies, UE101 is a multi-radio terminal (MRT) that is equipped with multiple radio modules co-located/coexisted on the same device platform (i.e., in-device).

Due to radio spectrum regulation, different radio access technologies may operate in overlapping or adjacent radio spectrums. As illustrated in FIG. 1, UE101 communicates radio signal 106 with eNB102, radio signal 107 with WiFi AP103, radio signal 108 with BT104, and receives radio signal 109 from GPS105. Radio signal 106 belongs to 3GPP Band 40, radio signal 107 belongs to one of the fourteen WiFi channels, and radio signal 108 belongs to one of the seventy-nine Bluetooth channels. The frequencies of all those radio signals fall within a range from 2.3 GHz to 2.5 GHz, which may result in significant in-device coexistence (IDC) interference. The problem is more severe around the 2.4 GHz ISM (The Industrial, Scientific and Medical) radio frequency band (e.g., ranges from 2400-2483.5 MHz), which is used by both the WiFi channels and the Bluetooth channels.

One fundamental problem for IDC interference is that the transmission power of one radio transceiver is too strong to allow simultaneous reception on another co-located/coexisted radio transceiver. Therefore, if the transmitting radio transceiver can reduce its transmission power, then simultaneous reception of other transceivers becomes possible. In one novel aspect, UE101 detects IDC interference problem and applies power control solution by signaling adjusted power parameters to eNB102 to mitigate coexistence interference.

Figure 2A:
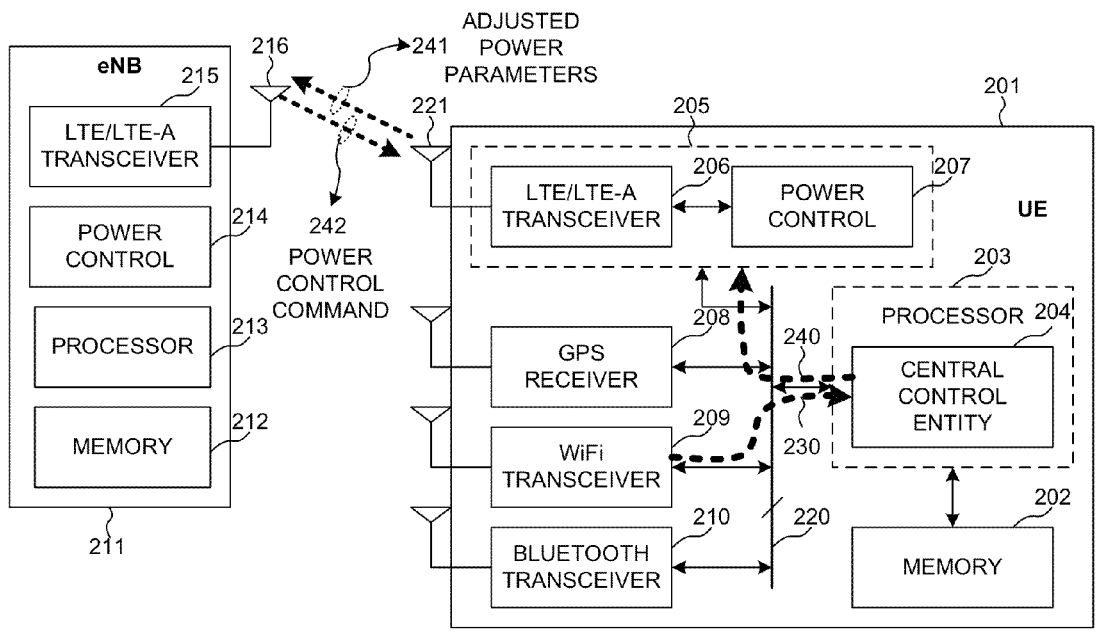
FIG. 2A illustrates simplified block diagrams of a UE and a base station (eNodeB) having power control modules in accordance with one novel aspect.

FIG. 2A illustrates simplified block diagrams of a user equipment UE201 and a base station eNB211 having power control modules in accordance with one novel aspect. UE201 comprises memory 202, a processor 203 having a central control entity 204, an OFDMA (LTE) radio module 205 having an LTE transceiver 206 coupled to antenna 221 and a power control module 207, a GPS receiver 208, a WiFi transceiver 209, a Bluetooth BT transceiver 210, and bus 220. On the other hand, eNB211 comprises memory 212, a processor 213, a power control module 214, and an LTE transceiver 215 coupled to antenna 216.

In the example of FIG. 2, central control entity 204 is a logical entity physically implemented within processor 203, which is also used for device application processing for UE201. Central control entity 204 is connected to various radio transceivers within UE201, and communicates with the various radio transceivers via bus 220. For example, WiFi transceiver 209 transmits WiFi activation/deactivation information, radio signal information, and/or WiFi traffic and scheduling information to central control entity 204 (e.g., depicted by a thick dotted line 230). Based on the received WiFi information, central control entity 204 determines control information and transmits the control information to LTE radio module 205 (e.g., depicted by a thick dotted line 240). In one embodiment, power control module 207 determines power parameters based on the control information. LTE radio transceiver 206 then communicates with eNB211 to mitigate IDC coexistence interference (e.g., depicted by thick dotted lines 241 and 242). In one example, upon detecting IDC interference, UE201 transmits adjusted UE-configured maximum transmitting power ($P_{CMAX}$) and power headroom report (PHR) to eNB211, and waits for transmit power control (TPC) command from eNB211 to decrease its transmit power for IDC interference mitigation. If TPC command is received, UE201 modifies transmitting power, e.g. $P_{PUSCH}$ or $P_{PUCCH}$, accordingly.

Figure 2B:
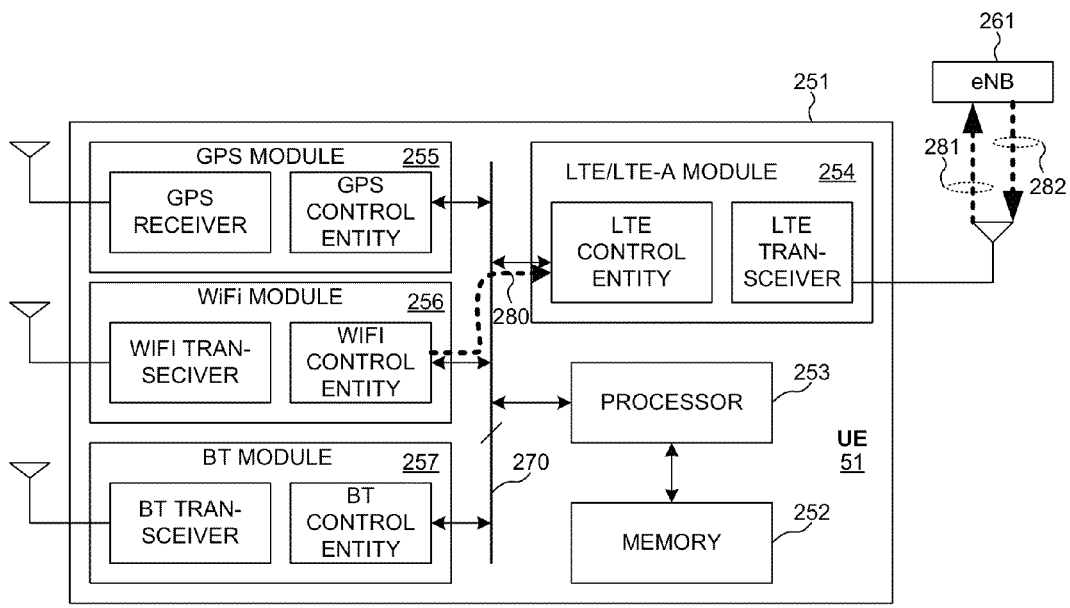
FIG. 2B illustrates a simplified block diagram of a user equipment having a control entity in accordance with one novel aspect.

FIG. 2B illustrates a simplified block diagram of a user equipment UE251 having a control entity in accordance with one novel aspect. Instead of relying on a central control entity, a distributed control model is used. UE251 comprises memory 252, a processor 253, an LTE radio module 254, a GPS module 255, a WiFi module 256, and a BT module 257. Each of the radio modules comprises a radio transceiver and a local control entity. In one embodiment, the LTE control entity 258 determines power parameters based on information exchanged with other radio modules (predefined or by configuration). For example, the control entity in WiFi module 256 transmits WiFi activation/deactivation information, radio signal information, and/or WiFi traffic and scheduling information to control entity 258 (e.g., depicted by a thick dotted line 280). Based on the received WiFi information, control entity 258 detects IDC interference condition and determines adjusted power parameters. The LTE radio transceiver 259 then communicates with eNB 261 to mitigate IDC coexistence interference (e.g., depicted by thick dotted lines 281 and 282).

Different solutions have been sought to avoid and/or mitigate IDC interference. In general, power control (PC) is a common functionally supported by every radio transceiver so reusing such mechanism to mitigate IDC interference is a low cost and backward compatible option. Power control can be used as a lightweight solution before applying other heavyweight solutions that either require more resource or control overhead (e.g., frequency division multiplexing (FDM) or radio resource management (RRM)), or have higher impact on throughput (e.g., time division multiplexing (TDM)). In some cases, power control may not solve IDC interference on its own and requires help from other complementary solutions.

Figure 3:
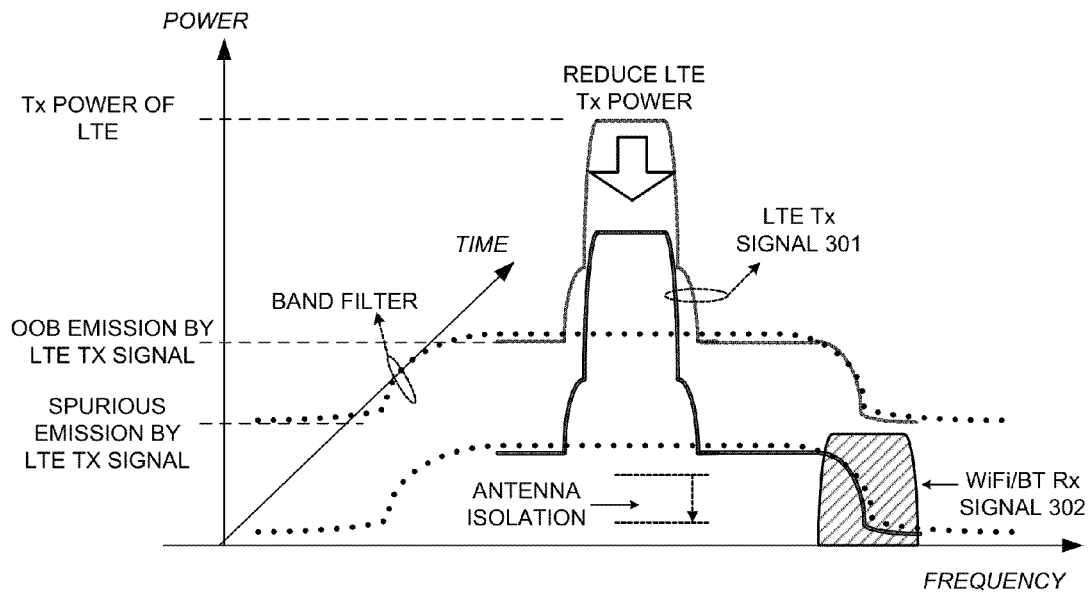
FIG. 3 illustrates an example of a power control solution for 3GPP in-device coexistence (IDC) interference mitigation.

FIG. 3 illustrates an example of a power control solution for 3GPP in-device coexistence (IDC) interference mitigation. In the example of FIG. 3, LTE TX signal 301 is transmitted by an LTE radio transceiver, while WiFi/BT RX signal 302 is received by a WiFi/BT radio transceiver. The LTE transceiver and the WiFi/BT transceiver are co-located on the same device platform of a UE. When TX signal 301 is very close to RX signal 302 in frequency domain, the out of band (OOB) emission and spurious emission resulted by imperfect TX filter and RF design of the LTE transceiver may be unacceptable to the WiFi/BT transceiver. For example, the TX signal power level by the LTE transceiver of TX signal 301 may be still higher (e.g. 60 dB higher before filtering) than the RX signal power level of RX signal 302 for the WiFi/BT transceiver even after the filtering (e.g., after 50 dB suppression), causing significant IDC interference.

Under power control solution, when LTE TX signal 301 is at a frequency channel close to WiFi/BT RX signal 302, the transmit power of the LTE transceiver can be reduced. In a first embodiment, a UE-centric power control solution is applied. The UE adjusts its power or power parameters locally without informing the serving eNB, which has no knowledge on the existence of such solution. For example, when the UE experiences IDC interference, the UE locally changes the pathloss or its compensation parameter to decrease its transmission power. In general, such solution is implemented by the UE as a quick fix for desperate situations, and thus requires no support from any standard. While such solution imposes no eNB complexity and is backward compatible, it is not in-line with general LTE principles. In addition, the eNB may increase the UE transmission power to offset the IDC interference mitigation effect.

In LTE/LTE-A systems, the legacy LTE power control mechanism should not be broken for IDC interference problems. Therefore, instead of locally reducing the LTE TX power directly, a more acceptable solution is to adjust power control parameters. In a second embodiment, the UE applies implicit power control signaling. The UE adjusts power parameters locally and informs the eNB through existing reporting. Upon receiving the power parameters, the eNB then adjusts the UE transmission power accordingly. Such solution is in-line with LTE principle and could be backward compatible via reusing existing power reporting mechanism. However, the solution may need some standard modification.

In a third embodiment, the UE applies explicit power control signaling. The UE explicitly informs the eNB to decrease UE transmission power, possibly with reason. The eNB then decreases the UE transmission power based on the requirement from the UE. In a first example, when experiencing IDC interference, the UE informs the eNB the existence of interference and the power reduction it applies through a new mechanism. In a second example, when experiencing IDC interference, the UE switches to a different power class. The new power class may be signaled via UE capability, new RRC message, or new MAC CE. Because IDC interference could be quite dynamic, the network has to support on-the-fly UE capability if UE power class is treated as part of UE capability. Under such solution, the eNB and the network are aware of the IDC interference condition. However, it requires new signaling mechanism and increases network complexity.

In LTE/LTE-A systems, the UE transmit power $P_{PUSCH}(i)$ on a physical uplink shared channel (PUSCH) is defined by Eq. (1):

$$P_{PUSCH}(i) = \min\{P_{CMAX}, 10\log_{10}(M_{PUSCH}(i)) + P_{O\_PUSCH}(i) + \alpha(j)*PL + \Delta_{TF}(i) + f(i)\} \quad (1)$$

where $M_{PUSCH}(i)$, $\Delta_{TF}(i)$, $f(i)$ are parameters given by physical downlink control channel (PDCCH) grant from the eNB (Group A)

$P_{O\_PUSCH}(j)$ $\alpha(j)$, $\Delta_{TF}(i)$ are parameters signaled by radio resource control (RRC) from the eNB (Group B)

$P_{CMAX}$ (UE-configured maximum transmitting power), PL (pathloss) are parameters determined by the UE (Group C)

In LTE/LTE-A systems, the UE transmitting power is typically controlled by its serving eNB. Because the eNB does not know the UE's power capacity and power usage, the UE uses a power headroom report (PHR) mechanism to periodically provide the serving eNB with its power headroom (PH) value, which is defined as a power offset between a UE-configured maximum transmitting power (e.g., $P_{CMAX}$) and a UE-calculated current transmitting power (e.g., $P_{PUSCH}$). Based on the reported PHR and PcmAx, the eNB then controls the UE transmitting power accordingly. For example, the eNB may change the UE transmitting power by adjusting the number of resource blocks, the modulation and coding scheme in Group A, or by adjusting other power control parameters in Group B.

In one novel aspect, to mitigate IDC interference from LTE radio transceiver to other co-located/coexisted radio transceivers, the UE can adjust UE-configured maximum transmitting power $P_{CMAX}$ in Group C to a lower value. Typically, a lower $P_{CMAX}$ value also corresponds to a smaller PH value. Upon such implicit signaling, the lower $P_{CMAX}$ and the smaller PH value may cause the eNB to decrease the UE transmitting power and thereby reducing coexistence interference. This is a straightforward solution and can be added to standard or just be used as a quick implementation fix.

Figure 4:
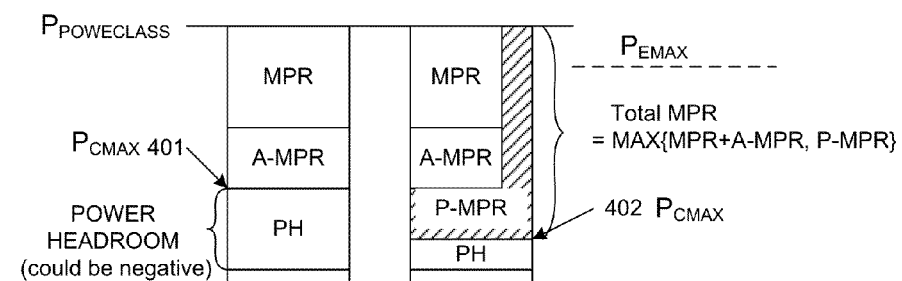
FIG. 4 illustrates power parameters of UE in LTE/LTE-A systems.

FIG. 4 illustrates power parameters of a UE in LTE/LTE-A systems. The UE-configured maximum transmitting power $P_{CMAX}$ is defined in Eq. (2), while the power headroom (PH) value of the UE is defined in Eq. (3):

$$P_{CMAX\_L} <= P_{CMAX} <= P_{CMAX\_H} \quad (2)$$

$$PH = P_{CMAX} - \text{UE transmit Power} \quad (3)$$

where $$P_{CMAX\_L} = \text{MIN}\{P_{EMAX} - \Delta T_C, P_{POWERCLASS} - \text{MAX}(MPR + A\text{-}MPR, P\text{-}MPR) - \Delta T_C\} \quad (4)$$

$$P_{CMAC\_H} = \text{MIN}\{P_{EMAX}, P_{POWERCLASS}\} \quad (5)$$

$P_{EMAX}$ is configured by higher layers $P_{POWERCLASS}$ is the maximum UE output power Maximum Power Reduction (MPR): the maximum allowed reduction of maximum power of certain modulation order and the number of resource blocks Additional Maximum Power Reduction (A-MPR): the maximum allowed reduction of maximum power for the number of resource blocks and the band P-MPR is the power management term for Maximum Power Reduction. P-MPR is a UE-controlled parameter to meet SAR requirement due to proximity, or avoid interference to another operating 3GPP RATs in a UE, e.g. currently the representative use case is LTE+CMA2000.

$\Delta_{TC}$=1.5 dB when the CC at the edge of a band; 0 dB otherwise

From Eq. (2), it can be seen that the lower bound of the UE-configured maximum transmitting power $P_{CMAX\_L}$ is controlled by the maximum UE output power $P_{POWERCLASS}$ and the maximum power reduction MPR, A-MPR, and P-MPR. Therefore, by increasing MPR, A-MPR, and/or P-MPR, the value of $P_{CMAX}$ can be decreased. For example, assuming $P_{POWERCLASS}$=23 dBm, MPR=2 dB, and A-MPR=1 dB. If there is no P-MPR, then the maximum transmitting power $P_{CMAX}$ is 20 dBm (e.g., as depicted by $P_{CMAX}$ 401 in FIG. 4). However, if P-MPR=6 dB is introduced due to UE implementation for IDC condition, then the maximum transmitting power $P_{CMAX}$ is decreased to 17 dBm when there is IDC condition (e.g., as depicted by $P_{CMAX}$ 402 in FIG. 4). $P_{CMAX}$ is a UE-configured hard limit, when eNB requests power higher than $P_{CMAX}$, UE scales the TX power (for $P_{PUSCH}$ or $P_{PUCCH}$ or combined) to $P_{CMAX}$. MPR is affected by the modulation order and the number of resource blocks while A-MPR is affected by the number of resource blocks and the band. Depends on UE implementation, P-MPR can be affected by the band, and the number of resource blocks, and the modulation order, and receiver sensitivity of coexisting modems, etc. According to Eq. (4), the total maximum power reduction is the bigger one between (MPR+A-MPR) and P-MPR. When P-MPR is smaller than MPR+A-MPR, it is hidden and cannot be seen by the network. The network becomes aware of P-MPR when P-MPR inserted by certain conditions, e.g. IDC, that dominates the total MPR.

Alternatively, if UE switch to a lower $P_{POWERCLASS}$, the value of $P_{CMAX}$ can also be decreased. Upon receiving a lower $P_{CMAX}$ or a smaller PH value, the eNB is likely to decrease the UE transmitting power. It should be noted that the eNB may also configure the UE transmit power based on other uplink control information (e.g. channel quality indicator (CQI) or sounding reference signal (SRS). For example, the UE may report CQI to a more conservative value or transmit SRS with a modified power, such that the eNB may adjust power control parameters (Group A or B) to decrease TX power of the UE. However, such scheme manipulates the power control mechanism by cheating the eNB to think that the channel condition is different and trigger the eNB to decrease TX power. Therefore, this kind of solution is in general not preferred by the network, and may only be used as quick implementation fix if no standard solution is available.

Figure 5:
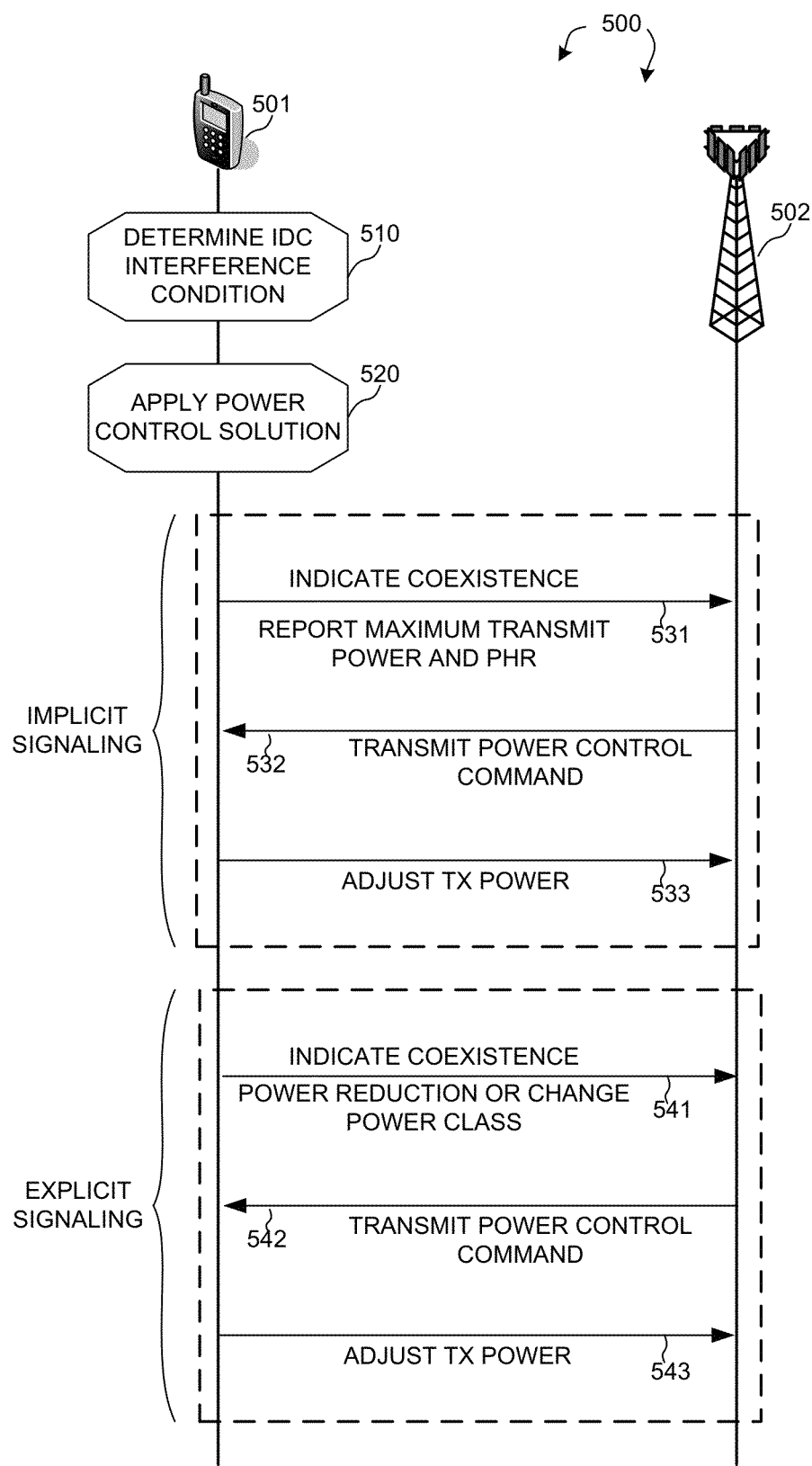
FIG. 5 illustrates a detailed procedure of in-device coexistence (IDC) interference mitigation in accordance with one novel aspect.

FIG. 5 illustrates a detailed procedure of a method of power control solution for mitigating IDC interference in a wireless communication system 500. Wireless communication system 500 comprises a UE501 and an eNB502. UE501 comprises multiple radio modules co-located on the same device platform. One of the radio modules is an LTE radio, and other radio modules may include WiFi/BT/GNSS radios. UE501 also comprises a central control entity that facilitates IDC interference mitigation mechanism. In step 510, UE501 determines an IDC interference condition. The IDC interference condition may be detected by the activation of the co-located WiFi/BT/GNSS radio, or by receiving signal/traffic information of the co-located WiFi/BT/GNSS radio. In one example, the central control entity may notify the LTE radio upon the activation of the WiFi radio. In another example, the central control entity may notify the LTE radio the signal quality and the traffic scheduling information of the WiFi radio. For LTE power control, the LTE radio module may base on the received signal quality of WiFi/BT/GNSS to estimate how much interference could further suffer. The LTE radio module may further base on the current maximum LTE transmitting power level to estimate the maximum LTE transmitting power level that can be afforded by the WiFi/BT/GNSS radio to achieve minimum received signal quality.

In step 520, upon determining the IDC interference condition, UE501 applies power control solution to mitigate the detected IDC interference. In a UE-centric solution, UE501 simply adjusts its power or power parameters locally without informing eNB502, which has no knowledge on the existence of such solution. For example, UE501 decreases TX power through PL compensation. In a first example, UE501 autonomously decreases the PL compensation parameter $\alpha(j)$ in Group B. In a second example, UE501 assumes a bias on PL estimation. Alternatively, eNB502 assigns two PL compensation parameters (or one PL parameter and a bias), one is for normal transmission and the other is for transmission in IDC scenario. UE501 switches between the two parameters autonomously. Optionally, UE501 may inform eNB the existence of IDC interference condition, which implies the switch.

In one embodiment of power control solution, UE501 applies power control with implicit signaling. In step 531, UE501 reports power parameters to eNB502. The power parameters comprise the UE-configured maximum transmitting power $P_{CMAX}$ and the power headroom report PHR. For example, UE501 adjusts $P_{CMAX}$ to a lower value. In addition, UE501 may also transmit a coexistence indicator to inform eNB502 of the coexistence interference condition. In step 532, eNB502 transmits a TPC command back to UE501 based on the received power parameters. For example, a lower $P_{CMAX}$ value causes eNB502 to decrease UE's TX power via the TPC command. In another example, eNB502 decreases UE's TX power via a PDCCH grant. In step 533, UE501 reduces the transmit power based on the TCP command or the PDCCH grant or RRC signaling to mitigate IDC interference.

Existing power headroom report (PHR) mechanism is used for the above-illustrated power control method with implicit signaling. The reporting period, delay and mapping of PH are defined in LTE standard. RRC control PH reporting by configuring the two timers periodicPHR-Timer and prohibit-PHR-Timer, and by signaling dl-PathlossChange which sets the change in measured downlink pathloss and the required power backoff due to power management. A PHR shall be triggered when prohibitPHR-Timer expires or has expired. In one example, PHR is triggered if the adjustment of the $P_{CMAX}$ or the PH value exceeds a threshold value (e.g., the required power backoff due to power management (as allowed by P-MPR) has changed more than dl-PathlossChange dB).

In another embodiment of power control solution, UE501 applies power control with explicit signaling. In step 541, when experience IDC interference, UE501 explicitly informs eNB502 the existence of the IDC interference. In a first example, UE501 applies TX power reduction and informs eNB502 the power reduction it applies through a new signaling mechanism. In a second example, UE501 changes power class to a lower value when another coexisted radio is activated, or when the coexisted radio starts receiving traffic. Likewise, UE501 changes power class to a higher value when the coexisted radio is deactivated, or when the coexisted radio stops receiving traffic. In step 542, eNB502 transmits a TPC command or an uplink grant back to UE501 based on the received power class. In step 543, UE501 changes the transmit power based on the TCP command or the uplink grant to mitigate IDC interference.

There are several possibilities for power class signaling. In one example, a new information element (IE) in UE capability is used to indicate the power class via UE capability. NAS would issue TA/RA/LA update with special clause to change UE power class. Currently, however, there is no support for UE capability change on the fly. For example, if a UE has changed its E-UTRA radio access capabilities, then this shall be triggered by NAS by a new RRC connection. Therefore, the UE would need to go to RRC_IDLE and then back to RRC_CONNECTED. Furthermore, only GREEN capabilities can be changed while UE is attached with a TAU. Change of E-UTRAN capabilities currently requires UE to detach (which removes the UE capabilities from MME) and attach again. To facilitate power class signaling via UE capability, a new network procedure (e.g., S1 procedure) may be introduced to allow more frequent UE capability rewrite for power class change. Furthermore, a new network procedure may be introduced to allow UE capability rewrite for attached UE. On the other hand, a prohibit timer may be used to limit the frequency of power class change of UE when UE is attached. Other possibilities for power class signaling include a new radio resource control (RRC) message and a new media access control (MAC) control element (CE). Informing the eNB trough a new RRC signaling or MAC CE instead of reusing UE capability signaling keeps the UE capability static. In this way, the network is transparent of the potential dynamic activities of the co-located radio modems.

Figure 6:
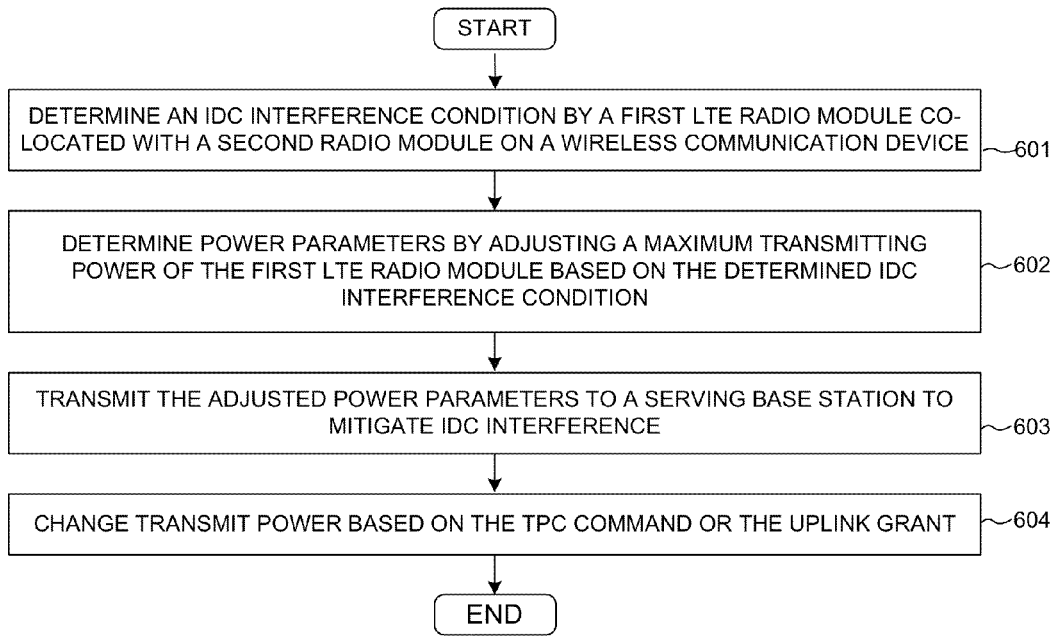
FIG. 6 is a flow chart of a first method of IDC interference mitigation using power control solution.

FIG. 6 is a flow chart of a first method of IDC interference mitigation using power control solution. In step 601, an LTE radio module of a UE determines an IDC interference condition. The LTE radio module is co-located with a second radio module on the same device platform. In step 602, upon detecting IDC interference condition, the UE determines power parameters by adjusting a maximum UE transmitting power of the LTE radio module. In step 603, the LTE radio module transmits the adjusted power parameters to a serving eNB. In step 604, the eNB transmits a TPC command or an uplink grant to the UE based on the received power parameters, and the UE changes the transmitting power based on the TCP command or the uplink grant to mitigate IDC interference.

Figure 7:
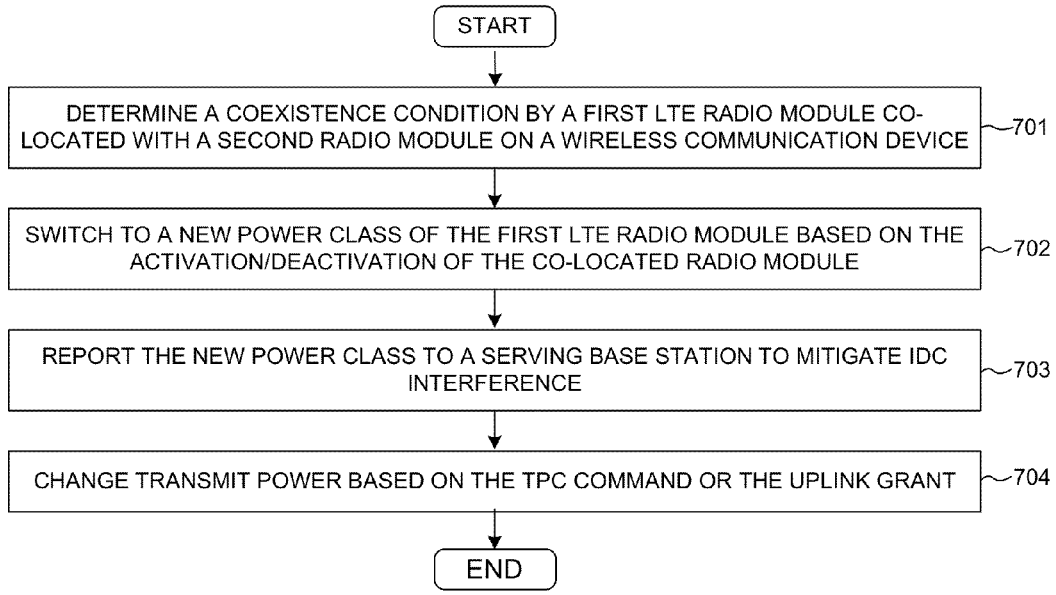
FIG. 7 is a flow chart of a second method of IDC interference mitigation using power control solution.

FIG. 7 is a flow chart of a second method of IDC interference mitigation using power control solution. In step 701, an LTE radio module of a UE determines a coexistence condition. The LTE radio module is co-located with a second radio module on the same device platform. In step 702, upon detecting the activation/deactivation of the co-located radio module, the UE switches power class of the LTE radio module. In step 703, the LTE radio module reports the new power class to a serving eNB. In step 704, the eNB transmits a TPC command or an uplink grant to the UE based on the received power class, and the UE changes the transmit power based on the TCP command or the uplink grant to mitigate IDC interference.

Although the present invention has been described in connection with certain specific embodiments for instructional purposes, the present invention is not limited thereto. For example, although an LTE-advanced mobile communication system is exemplified to describe the present invention, the present invention can be similarly applied to other mobile communication systems, such as Time Division Synchronous Code Division Multiple Access (TD-SCDMA) systems. Accordingly, various modifications, adaptations, and combinations of various features of the described embodiments can be practiced without departing from the scope of the invention as set forth in the claims.

What is claimed is:

1. A method comprising:
    (a) determining an in-device coexistence (IDC) interference condition by a first OFDMA radio module co-located with a second radio module on a wireless communication device (UE);
    (b) determining power parameters by adjusting a UE-configured maximum transmitting power of the first OFDMA radio module via adjusting a maximum power reduction (MPR) value based on the determined IDC interference condition, wherein the power parameters comprise the UE-configured maximum transmitting power set by the UE and a power headroom report (PHR) of the first radio module; and
    (c) transmitting the adjusted power parameters to a serving base station.

2. The method of claim 1, wherein the determining in (a) involves receiving a coexistence notification from a control entity on the wireless device.

3. The method of claim 1, wherein the determining in (a) involves an activation or deactivation of the second radio module.

4. The method of claim 1, wherein the adjusting in (b) involves increasing a maximum power reduction (MPR) value and thereby decreasing the UE-configured maximum transmitting power of the first radio module.

5. The method of claim 1, wherein the adjusted power parameters are transmitted to the serving base station in (c) upon satisfying a triggering condition.

6. The method of claim 5, wherein the triggering condition in (c) is satisfied if an adjustment of the UE-configured maximum transmitting power exceeds a threshold value.

7. The method of claim 1, further comprising:
    (d) transmitting a coexistence indicator from the first LTE radio module to the serving base station.

8. A wireless communication device (UE), comprising:
    a first OFDMA radio module that determines an in-device coexistence (IDC) interference condition, wherein the first OFDMA radio module is co-located with a second radio module on the wireless communication device, wherein the first OFDMA radio module comprises:
        a power control module that determines power parameters by adjusting a UE-configured maximum transmitting power of the first radio module via adjusting a maximum power reduction (MPR) value based on the determined IDC interference condition, wherein the power parameters comprise the UE-configured maximum transmitting power set by the UE and a power headroom report (PHR) of the first radio module; and
        a radio transceiver that transmits the adjusted power parameters to a serving base station.

9. The device of claim 8, wherein the first OFDMA radio module receiving a coexistence notification from a control entity on the wireless device.

10. The device of claim 8, wherein the first OFDMA radio module detects an activation or deactivation of the second radio module.

11. The device of claim 8, wherein the power control module increases a maximum power reduction (MPR) value and thereby decreasing the UE-configured maximum transmitting power of the first radio module.

12. The device of claim 8, wherein the adjusted power parameters are transmitted to the serving base station upon satisfying a triggering condition.

13. The device of claim 12, wherein the radio transceiver transmits the adjusted power parameters if an adjustment of the UE-configured maximum transmitting power exceeds a threshold value.

14. The device of claim 8, wherein the radio transceiver transmits a coexistence indicator to the serving base station.

15. A wireless communication device (UE), comprising:
    a first OFDMA radio module that determines an in-device coexistence (IDC) interference condition, wherein the first OFDMA radio module is co-located with a second radio module on the wireless communication device, wherein the first OFDMA radio module comprises:
       a power control module that switches to a new UE power class of the first OFDMA radio module based on the determined IDC interference condition; and
       a transmitter that reports the new UE power class to a serving base station to mitigate IDC interference.

16. The device of claim 15, wherein the IDC interference condition is determined by receiving a coexistence notification from a control entity on the wireless device.

17. The device of claim 15, wherein the IDC interference condition is determined based on an activation or deactivation of the second radio module.

18. The device of claim 15, wherein the UE power class reporting is via a radio resource control (RRC) message.

19. The device of claim 15, wherein the UE power class reporting is via a media access control (MAC) control element (CE).

20. The device of claim 15, wherein the UE power class reporting is via an information element (IE) contained in user equipment (UE) capability.

\* \* \* \* \*